3,178,476
DI- OR TRI-HYDROXYBENZYL HYDRAZIDES
Balthasar Hegedüs, Binningen, and Paul Zeller, Allschwil,
Switzerland, assignors to Hoffmann-La Roche Inc., Nutley, N.J., a corporation of New Jersey
No Drawing. Filed May 29, 1962, Ser. No. 198,454
Claims priority, application Switzerland, June 16, 1961,
7,072/61
7 Claims. (Cl. 260—562)

This invention relates to novel hydrazine compounds. More specifically, the novel hydrazine compounds of this invention are selected from the group consisting of compounds of the formula

and pharmaceutically acceptable acid addition salts thereof; wherein $R_1$ is selected from the group consisting of hydrogen and amino-substituted acyl; and $n$ is a whole integer from 2 to 3.

The radical $R_1$ in Formula I besides hydrogen, can be an amino-substituted acyl moiety, preferably an $\alpha$-aminoacyl moiety as, for example, seryl, threonyl, alanyl, or the like, or a $\beta$-amino-acyl moiety for example, $\beta$-aminopropionyl. Preferred compounds as illustrated by the foregoing exemplary listing are those wherein the acyl moiety is lower alkanoyl and is either unsubstituted, with the exception of the amino group, or bears, in addition to the amino substituent, a hydroxy substituent.

The compounds of Formula I above can be prepared by a process comprising reaction of a hydrazine of the formula $$R_1\text{—NH—NH}_2 \quad \text{(II)}$$

wherein $R_1$ has the same meaning as above, and the hydrogen atoms of the hydrazine moiety can be replaced by protecting groups or a salt thereof, with a carbonyl compound of the formula

wherein $R_2$ represents hydroxy or hydroxy etherified with a hydrogenolytically splittable alkyl moiety, and $n$ has the same meaning as above;

followed by hydrogenation of the so-formed hydrazone whereupon, if necessary, protecting groups are split off from the so-formed hydrazine compound, and finally, if desired, acylation and/or conversion into a salt.

Thus, according to the above process, a hydrazine of Formula II or a salt thereof is reacted with a carbonyl compound of Formula III and the so-formed hydrazone either isolated and then hydrogenated or hydrogenated directly without isolation. The hydrogenation is suitably effected via use of a hydrogenation catalyst such as platinum or palladium-carbon, or by reaction with lithium aluminum hydride. As suitable hydrogenolytically splittable protecting groups for the phenyl hydroxyl substituents there can be used, for example, benzyl or the like. When a hydrazine of Formula II is employed which is substituted by hydrogenolytically splittable acyl protecting groups, for example, the carbobenzoxy moiety, said protecting groups can be split off simultaneously with the hydrogenation of the hydrazone.

When a starting material of Formula II wherein $R_1$ is hydrogen is used a product of Formula I is obtained wherein $R_1$ is hydrogen. If desired, an additional reaction step comprising treatment of the so-obtained product with an amino-substituted acylating agent can be effected and a compound of Formula I obtained wherein $R_1$ is amino-acyl.

The novel compounds of Formula I and their pharmaceutically acceptable acid addition salts are useful in vivo and in vitro as decarboxylase inhibitors. They are, accordingly, useful in the treatment of psychic illnesses and also for their hypotensive effect on blood pressure.

Novel compounds of Formula I above or their pharmaceutically acceptable acid addition salts can be administered internally, for example, orally or parenterally, in conventional pharmaceutical formulations which, for example, can contain the active ingredients in mixture with enteral or parenteral pharmaceutical organic or inorganic inert carrier materials such as, for example, water, gelatin, lactose, starch, magnesium stearate, talc, plant oils, gums, polyalkylene glycols, Vaseline or the like. The pharmaceutical preparations can be in a conventional solid form, such as, tablets, dragees, suppositories, capsules, or the like, or in a conventional liquid form, such as solutions, suspensions, emulsions, or the like. If desired, they can be sterilized and can contain conventional pharmaceutical adjuvants such as preservatives, stabilizing agents, emulsifying agents, buffers, or salts to adjust osmotic pressure. The pharmaceutical preparations can also contain other pharmaceutically active materials, besides the active compounds of this invention.

The following examples are illustrative but not limitative of the invention. All temperatures are in degrees centigrade.

*Example 1*

16.0 g. of 3,4-dibenzyloxy-benzaldehyde was dissolved in 250 ml. of warm absolute ethanol and the mixture treated with a solution of 7.7 g. of DL-seryl-hydrazide hydrochloride in a small amount of water. The mixture was boiled for 15 minutes on a steambath resulting in a thick slurry which was permitted to cool down, filtered with suction, and washed with ethanol, ether and petroleum ether. The so-obtained DL-seryl-(3,4-dibenzyloxy-benzylidene)-hydrazide hydrochloride melted at 200–202° and was poorly soluble in cold water, but readily soluble in hot water.

The above product was suspended in a mixture of 200 ml. of water and 200 ml. of methanol and hydrogenated in the presence of palladium-carbon. The hydrogenation stopped after the absorption of 1800 ml. of hydrogen. This amount approximately corresponded to the amount necessary for the hydrogenolysis of the benzyl ether groups. The catalyst was filtered off with suction, and 250 mg. of platinum oxide added to the solution which was then further hydrogenated. In this step a further 400 ml. of hydrogen was absorbed. The reaction mixture was then filtered in vacuo to dryness and the residue dried by twice being evaporated from an ethanolic solution in vacuo. The mixture was then dissolved in 200 ml. of luke warm absolute ethanol, filtered clear, and treated with 200 ml. of ethyl acetate. The reaction mixture was permitted to stand overnight at −15°, filtered with suction, and rinsed with ethyl acetate and ether. It was then dried over phosphorus pentoxide in vacuo and the product, DL-seryl-(3,4-dihydroxy-benzyl)-hydrazide hydrochloride, melted at 90–100° (dec.) and was readily soluble in water yielding a neutral solution.

*Example 2*

A warm solution of 13.8 g. of protocatechualdehyde (3,4-dihydroxy-benzaldehyde) in 100 ml. of water was dissolved in a solution of 15.5 g. of DL-seryl-hydrazide hydrochloride in 200 ml. of water. 0.5 g. of platinum oxide was then added to the reaction mixture, which was then hydrogenated. In the course of about 36 hours, 2.6 liters of hydrogen was absorbed and the reaction mixture was then filtered, evaporated in vacuo and worked up as described in Example 1, yielding DL-seryl-(3,4-dihydroxy-benzyl)-hydrazide hydrochloride which melted at 90–100° (dec.).

*Example 3*

35.5 g. of DL-seryl-hydrazide hydrochloride was dissolved in 350 ml. of water and 35 g. of pyrogallolaldehyde (2,3,4-trihydroxy-benzaldehyde) added thereto at one time. In about 5–10 minutes a clear solution resulted, whereupon slow crystallization occurred and the temperature rose to about 6–7°. The crystallization was permitted to continue overnight at 5°, and the very fine precipitate was then isolated by centrifugation and in the centrifuge washed with water, ethanol, and ether, yielding the dihydrate of DL-seryl-(2,3,4-trihydroxy-benzylidene)-hydrazide hydrochloride, which melted at 134–136° and was poorly soluble in cold water, but very readily dissolved in hot water.

The condensation was also effected in absolute ethanol yielding the anhydrous form of the hydrazone, which melted at 225–228°.

33.5 g. of the hydrazone-dihydrate was suspended in 330 ml. of methanol and hydrogenated with 2.5 g. of palladium-carbon. After the absorption of 2.8 liters of hydrogen, the catalyst was filtered off and the solution evaporated in vacuo to a weight of about 52–55 g. It was then immediately mixed with 160 ml. of absolute ethanol and permitted to crystallize for 24 hours at room temperature, and then for a further 24 hours at 0°. The product was then filtered off with suction and washed with absolute ethanol and absolute ether. The so-obtained DL-seryl-(2,3,4-trihydroxy-benzyl)-hydrazide hydrochloride formed a white crystalline powder which was readily soluble in water and which melted at 146–148°.

*Example 4*

21 g. of 2,3,4-tribenzyloxy-benzaldehyde was dissolved in a mixture of 300 ml. of methanol and 3 ml. of glacial acetic acid and was then treated with 6 g. DL-seryl-hydrazide in 8 ml. of water. The reaction mixture was then boiled for 3 hours under reflux, evaporated in vacuo and diluted with 300 ml. of methylene chloride. It was then shaken in 200 ml. of 3 N ammonia (decomposition of the acetate), the methylene chloride solution washed twice with water, dried with sodium sulfate, and evaporated in vacuo. Upon trituration with ether the residue formed a crystalline powder. After recrystallization from acetonitrile the product, DL-seryl-(2,3,4-tribenzyloxy-benzylidene)-hydrazide, melted at 136–138°.

10.3 g. of this hydrazone was suspended in a mixture of 200 ml. of methanol and 50 ml. of water, and then hydrogenated with palladium-carbon. In the course of 24 hours, 2050 ml. of hydrogen was absorbed. Upon termination of the hydrogenation, dilute hydrochloric acid was added to the reaction mixture until there was obtained a pH of about 4.8. The catalyst was then filtered off and the reaction mixture evaporated in vacuo. The product was worked up according to the procedure described above in Example 3, yielding DL-seryl-(2,3,4-tribenzyloxy-benzyl)-hydrazide hydrochloride.

*Example 5*

8.4 g. of DL-threonyl-hydrazide hydrochloride was dissolved in 120 ml. of water and 7.7 g. of pyrogallolaldehyde added thereto with stirring. In about 30 minutes there was obtained a slurry, which was isolated by centrifugation according to the procedure described above in Example 3. There was thus obtained the dihydrate of DL-threonyl-(2,3,4 - trihydroxy - benzylidene) - hydrazide hydrochloride, which melted at 217–219°.

The conversion of this hydrazone into DL-threonyl-(2,3,4-trihydroxy-benzyl)-hydrazide hydrochloride was conducted according to the procedure described above in Example 3. The so-obtained product was readily soluble in water and melted at 124–127°.

*Example 6*

21 g. of DL-alanyl-hydrazide hydrochloride was dissolved in 300 ml. of water and 23 g. of pyrogallolaldehyde added thereto with stirring. In a short time a clear solution resulted, which was evaporated in vacuo. The residue was triturated with absolute ethanol, whereby there was obtained DL-alanyl-(2,3,4-trihydroxy-benzylidene)-hydrazide hydrochloride as anhydrous crystals melting at 257–260° (dec.).

28 g. of this hydrazone was dissolved in 350 ml. of water and hydrogenated with palladium-carbon. After termination of the hydrogen absorption, the reaction mixture was filtered and concentrated in vacuo to about 40 ml. Upon dilution with 150 ml. of absolute ethanol, crystallization commenced. The so-obtained DL-alanyl-(2,3,4-trihydroxy-benzyl)-hydrazide hydrochloride melted at 170–172°.

*Example 7*

21.2 g. of 2,3,4-tribenzyloxy-benzaldehyde and 8.3 g. of carbobenzoxy-hydrazine were boiled in 300 ml. of absolute ethanol for 2 hours under reflux, cooled down, filtered with suction, and washed with ethanol and ether, yielding 2,3,4-tribenzyloxy-benzylidene-carbobenzoxy-hydrazone, which melted at 114–115°.

54 g. of this hydrazone was suspended in 500 ml. of methanol and 6 ml. of glacial acetic acid, and then hydrogenated with palladium-carbon. After the absorption of 5 moles of hydrogen, the hydrogenation was terminated and the so-formed clear solution filtered, and concentrated to a syrup in vacuo. This was then dissolved in 200 ml. of absolute ethanol and permitted to crystallize for 3–4 days at −15°. It was then filtered with suction, and the precipitate washed with absolute ethanol, ether and petroleum ether, yielding 2,3,4-trihydroxy-benzyl-hydrazine acetate ethanolate which melted at 91–92° and was readily soluble in water yielding a neutral solution.

*Example 8*

30.8 g. of 2,3,4-trihydroxy-benzaldehyde and 24.4 g. of benzyl-hydrazine were dissolved in a mixture of 400 ml. of methanol and 12 ml. of glacial acetic acid, and then hydrogenated in the presence of palladium-carbon. In the course of 24 hours, 8.4 liters of hydrogen was absorbed. The catalyst was then filtered off, the reaction mixture evaporated in vacuo, the residual syrup was crystallized from 200 ml. of absolute ethanol. After three days the mixture was filtered and the residue washed with absolute ethanol, ether, and petroleum ether, yielding 2,3,4-trihydroxy-benzyl-hydrazine acetate ethanolate, which was identical with the product obtained in Example 7 above.

We claim:
1. A compound selected from the group consisting of compounds of the formula

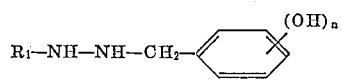

and pharmaceutically acceptable acid addition salts thereof; wherein $R_1$ is selected from the group consisting of hydrogen, amino-lower alkanoyl and hydroxy-substituted amino-lower alkanoyl; and $n$ is a whole integer from 2 to 3.
2. Seryl-(3,4-dihydroxybenzyl)-hydrazide.
3. Seryl-(2,3,4-trihydroxybenzyl)-hydrazide.
4. Threonyl-(2,3,4-trihydroxybenzyl)-hydrazide.
5. Alanyl-(2,3,4-trihydroxybenzyl)-hydrazide.
6. 2,3,4-trihydroxybenzyl-hydrazine.
7. A compound of the formula

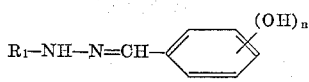

wherein $R_1$ is selected from the group consisting of seryl, threonyl and alanyl; and $n$ is a whole integer from 2 to 3.

References Cited by the Examiner
FOREIGN PATENTS
836,332  6/60  Great Britain.

OTHER REFERENCES
Zeller et al.: Annals of New York Academy of Science, vol. 80, Art. 3, pages 555–567 (1959).
Biel et al.: Jour. Am. Chem. Soc., vol. 81, page 2809 (1959).

IRVING MARCUS, *Primary Examiner.*
DUVAL T. McCUTCHEN, WALTER A. MODANCE, *Examiners.*